US012793598B2

(12) United States Patent
Shi et al.

(10) Patent No.: US 12,793,598 B2
(45) Date of Patent: Nov. 10, 2026

(54) PIXEL DRIVE CIRCUIT AND DISPLAY PANEL

(71) Applicant: HKC CORPORATION LIMITED, Shenzhen (CN)

(72) Inventors: Jun Shi, Shenzhen (CN); Lidan Ye, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 19/190,314

(22) Filed: Apr. 25, 2025

(65) Prior Publication Data

US 2025/0336329 A1 Oct. 30, 2025

(30) Foreign Application Priority Data

Apr. 29, 2024 (CN) ........................ 202410535271.0

(51) Int. Cl.
*G09G 3/20* (2006.01)

(52) U.S. Cl.
CPC ... *G09G 3/2074* (2013.01); *G09G 2300/0426* (2013.01); *G09G 2310/0202* (2013.01); *G09G 2310/08* (2013.01)

(58) Field of Classification Search
CPC .................................................. G09G 3/2074
USPC ........................................................... 345/55
See application file for complete search history.

(56) References Cited

U.S. PATENT DOCUMENTS

2020/0278587 A1* 9/2020 Fukami ............... G02F 1/13338
2020/0380239 A1* 12/2020 Lee .................... G06V 40/1318
2020/0394381 A1* 12/2020 Ryu ..................... G09G 3/3233
2021/0097252 A1* 4/2021 Lee ......................... G06F 3/041
2022/0013543 A1* 1/2022 Hosoyachi ........... H10D 86/441
2022/0157233 A1* 5/2022 Zheng .................. G09G 3/3233

FOREIGN PATENT DOCUMENTS

CN 101976550 A 2/2011
CN 102646389 A 8/2012
CN 103943090 A 7/2014
CN 114609814 A 6/2022
CN 116612708 A 8/2023
CN 117809568 A 4/2024
DE 102006014873 A1 10/2006

OTHER PUBLICATIONS

The first office action issued in corresponding CN application No. 202410535271.0 dated Sep. 30, 2025.
Second Office Action issued in corresponding CN application No. 202410535271.0 dated Apr. 10, 2026.

* cited by examiner

*Primary Examiner* — Calvin C Ma
(74) *Attorney, Agent, or Firm* — Hauptman Ham, LLP

(57) ABSTRACT

A pixel drive circuit and a display panel are provided. Multiple columns of pixel units are arranged in a row direction. Multiple data lines are spaced apart from one another and extend in a column direction, where each data line is electrically connected to one column of pixel units. The number of source drive lines is less than the number of data lines. A first connection end of each switch assembly is electrically connected to at least one data line, a second connection end of each switch assembly is electrically connected to one source drive line, and at least two data lines are electrically connected to a same source drive line through different switch assemblies.

14 Claims, 10 Drawing Sheets

PIXEL DRIVE CIRCUIT AND DISPLAY PANEL

CROSS-REFERENCE TO RELATED APPLICATIONS

This application claims priority to Chinese Patent Application No. 202410535271.0, filed Apr. 29, 2024, the disclosure of which is incorporated herein for reference.

TECHNICAL FIELD

The disclosure relates to the field of display technology, and in particular to a pixel drive circuit and a display panel.

BACKGROUND

Drive signal lines of a display panel are disposed in a non-display region of the display panel, i.e., the bezel of the display panel. An increase in pixel units leads to an increase in the drive signal lines, and the increase in the drive signal lines leads to a lager region occupied by the non-display region. As a result, the width of the bezel of the display panel is increased, which is not conducive to increasing the screen-to-body ratio. In addition, the increase in the drive signal lines brings difficulty in the layout of electrical connection between the drive signal lines and the display drive chip. On this basis, how to provide a pixel drive circuit and a display panel which can reduce the region occupied by the non-display region, narrow the bezel, and reduce the difficulty in wiring becomes a technical problem to be solved.

SUMMARY

In a first aspect, a pixel drive circuit is provided in embodiments of the present disclosure. The pixel drive circuit includes multiple columns of pixel units, multiple data lines, multiple source drive lines, and multiple switch assemblies. The multiple columns of pixel units are arranged in a row direction. The multiple data lines are spaced apart from one another and extend in a column direction, where each of the multiple data lines is electrically connected to one column of pixel units. The number of source drive lines is less than the number of data lines. A first connection end of each of the multiple switch assemblies is electrically connected to at least one of the multiple data lines, a second connection end of each of the multiple switch assemblies is electrically connected to one of the multiple source drive lines, and at least two of the multiple data lines are electrically connected to a same source drive line through different switch assemblies.

The pixel drive circuit and a display panel provided in embodiments of the present disclosure have the following designs. The multiple columns of pixel units are arranged in the row direction. The multiple data lines are spaced apart from one another and extend in the column direction, where each of the multiple data lines is electrically connected to one column of pixel units. The number of source drive lines is less than the number of data lines. The first connection end of each of the multiple switch assemblies is electrically connected to at least one of the multiple data lines, the second connection end of each of the multiple switch assemblies is electrically connected to one of the multiple source drive lines, and at least two of the multiple data lines are electrically connected to the same source drive line through different switch assemblies. In this way, the multiple data lines can reuse one source drive line, which reduces the number of source drive lines, thereby improving the wiring layout of scan drive lines, reducing a region occupied by a non-display region, narrowing the bezel, and reducing the difficulty in wiring.

In an optional embodiment, each of the multiple source drive lines is electrically connected to at least two of the multiple data lines in adjacent columns.

In an optional embodiment, the multiple adjacent data lines electrically connected to the same source drive line include a first data line and a second data line. The multiple switch assemblies include a first sub-switch and a second sub-switch, a second connection end of the first sub-switch and a second connection end of the second sub-switch are electrically connected to the same source drive line, a first connection end of the first sub-switch is electrically connected to the first data line, and a first connection end of the second sub-switch is electrically connected to the second data line.

In an optional embodiment, the pixel drive circuit further includes at least one first control line and at least one second control line, where the at least one first control line is electrically connected to a control end of the first sub-switch, the at least one second control line is electrically connected to a control end of the second sub-switch, at least one first control line electrically connected to different source drive lines are electrically connected, and at least one second control line electrically connected to different source drive lines are electrically connected.

In an optional embodiment, during a first period, pixel units in the n-th row are configured to be in an on-state ("ON"), the first sub-switch is configured to conduct the source drive line with the first data line, and the source drive line is configured to supply a first data voltage to the first data line. During a second period, the pixel units in the n-th row are configured to be ON, the second sub-switch is configured to conduct the source drive line with the second data line, and the source drive line is configured to supply a second data voltage to the second data line.

In an optional embodiment, the pixel drive circuit further includes multiple scan lines, multiple scan drive lines, and multiple switch units. The multiple scan lines are spaced apart from one another and extend in the row direction, where each of the multiple scan lines is electrically connected to one row of the pixel units. The number of scan drive lines is less than the number of scan lines. A first connection end of each of the multiple switch units is electrically connected to at least one of the multiple scan lines, a second connection end of each of the multiple switch units is electrically connected to one of the multiple scan drive lines, and at least two of the multiple scan lines are electrically connected to a same scan drive line through different switch units.

In an optional embodiment, the multiple scan drive lines include multiple first scan drive lines and multiple second scan drive lines. The multiple first scan drive lines are disposed on one side of multiple rows of pixel units, and the multiple second scan drive lines are disposed on the other side of the multiple rows of pixel units. One of the multiple first scan drive lines is electrically connected to at least two of the multiple scan lines in odd-numbered rows, and one of the multiple second scan drive lines is electrically connected to at least two of the multiple scan lines in even-numbered rows. Alternatively, one of the multiple first scan drive lines is electrically connected to at least two of the multiple scan lines in adjacent rows, and one of the multiple second scan drive lines is electrically connected to at least two of the multiple scan lines in adjacent rows.

In an optional embodiment, the multiple scan drive lines further include multiple switch control lines, where the multiple switch control lines include multiple first switch control lines and multiple second switch control lines. The multiple first switch control lines and the multiple first scan drive lines are disposed on one side of the multiple rows of pixel units, and the multiple second switch control lines and the multiple second scan drive lines are disposed on the other side of the multiple rows of pixel units. A control end of each of the multiple switch units electrically connected to different first scan drive lines is electrically connected to the same first switch control line, and/or a control end of each of the multiple switch units electrically connected to different second scan drive lines is electrically connected to a same second switch control line.

In an optional embodiment, first connection ends of the multiple switch units and second connection ends of the multiple switch units electrically connected to the same scan drive line are conducted at different times in response to the multiple scan drive lines being configured to provide a turn-on signal to each of the multiple scan lines at different time sequences.

In a second aspect, a display panel is provided in embodiments of the present disclosure. The display panel includes a display drive chip and the pixel drive circuit of the first aspect. The display panel has a display region, a first side region on one side of the display region, a second side region on the other side of the display region, and a bottom region at the bottom of the display region. The display drive chip is disposed in the bottom region and has a first connection surface, a second connection surface, and a third connection surface connected in sequence, where the first connection surface faces the first side region, the second connection surface faces the display region, and the third connection surface faces the second side region. The multiple columns of pixel units, the multiple scan lines, and the multiple data lines are all disposed in the display region, a part of the multiple scan drive lines is disposed in the first side region and extends into the bottom region to be electrically connected to the first connection surface of the display drive chip, and the other part of the multiple scan drive lines is disposed in the second side region and extends into the bottom region to be electrically connected to the third connection surface of the display drive chip. The multiple source drive lines are disposed in the bottom region and are electrically connected to the second connection surface of the display drive chip.

BRIEF DESCRIPTION OF THE DRAWINGS

In order to explain technical solutions in embodiments of the present disclosure more clearly, the following will give a brief introduction to accompanying drawings that are needed to be used in the description of embodiments. Apparently, the accompanying drawings in the following description are some embodiments of the present disclosure. For those of ordinary skill in the art, other accompanying drawings can be obtained according to these accompanying drawings without creative efforts.

Figure 1:
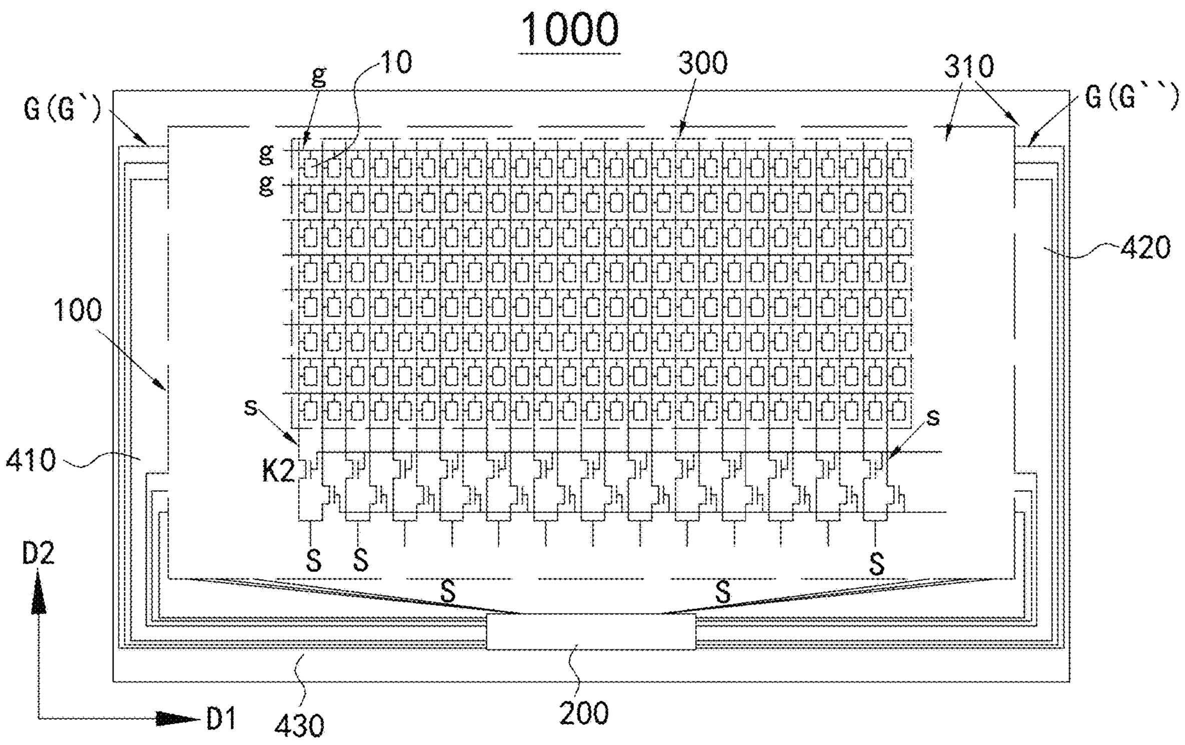
FIG. 1 is a schematic structural diagram of a display panel provided in embodiments of the present disclosure.

REFERENCE SIGNS display panel 1000, pixel drive circuit 100, display drive chip 200, first connection surface 210, second connection surface 220, third connection surface 230, first side region 410, second side region 420, display region 300, non-display region 310, bottom region 430, pixel unit 10, scan line g, scan drive line G, switch unit K1, column direction D1, row direction D2, data line s, source drive line S, first scan drive line G', second scan drive line G", switch control line SW, first switch control line SW', second switch control line SW", first sub-control line SW1, second sub-control line SW2, third sub-control line SW3, fourth sub-control line SW4, first switch unit SW1-1, second switch unit SW1-2, third switch unit SW2-1, fourth switch unit SW2-2, switch assembly K2, first sub-switch SW5-1, second sub-switch SW6-1, third sub-switch SW5-2, fifth sub-switch SW5-3, fourth sub-switch SW6-2, and sixth sub-switch SW6-3.

DETAILED DESCRIPTION

Technical solutions of embodiments of the present disclosure will be described clearly and completely with reference to accompanying drawings in embodiments of the present disclosure. Apparently, embodiments described herein are merely some embodiments, rather than all embodiments, of the present disclosure. Based on embodiments of the present disclosure, all other embodiments obtained by those of ordinary skill in the art without creative effort shall fall within the protection scope of the present disclosure. The term "embodiment" or "implementation" referred to herein means that a particular feature, structure, or characteristic described in conjunction with the embodiment or embodiment can be contained in at least one embodiment of the present disclosure. The phrase appearing in various places in the specification does not necessarily refer to the same embodiment, nor does it refer to an independent or alternative embodiment that is mutually exclusive with other embodiments. It is expressly and implicitly understood by those of skilled in the art that embodiments described herein can be combined with other embodiments.

It should be noted that the terms such as "first", "second", etc., in the specification, the claims, and the above accompanying drawings of the present disclosure are used to distinguish different objects, rather than describing a particular order. Furthermore, the terms "including", "comprising", and "having" as well as variations thereof are intended to cover a non-exclusive inclusion.

The present disclosure provides a pixel drive circuit and a display panel, which can reduce a region occupied by a non-display region, narrow bezel, and reduce the difficulty in wiring.

Referring to FIG. 1, a display panel 1000 is provided in the present disclosure. The display panel 1000 is applicable to, but is not limited to, an electronic paper panel, a mobile phone, a television, a wireless apparatus, a personal digital assistant (PDA), a handheld or portable computer, a global position system (GPS) receiver/navigator, a camera, an MP4 video player, a video camera, a game console, a watch, a clock, a calculator, a television monitor, a flat-panel display (FPD), a computer monitor, and an automobile display (e.g., an odometer display, etc.), a navigator, a cockpit controller and/or display, a camera view display (e.g., a display of a rear-view camera in a vehicle), an electronic photograph, an electronic billboard or sign, a projector, etc.

For illustrative purposes, the display panel 1000 is electronic paper. The electronic paper is a new display technology. As people have higher requirements on display quality and size, the electronic paper panel has an increased number of pixel units 10 and an increased number of data signal lines and scan lines for transmitting the pixel units 10. Currently, a scan drive architecture of the electronic paper is that a display drive chip outputs scan signals which are transmitted to corresponding scan input positions through lines in a non-display region 310 of the display panel 1000.

In the present disclosure, full high definition (FHD) 1920*1080 is taken as an example. Since a single display drive chip is electrically connected to a data line s of a 960 signal channel, two display drive chips are required to drive an existing display drive chip and the cost of the display drive chip is high. In addition, in terms of wiring layout, the number of source drive lines S is relatively large, pull-out angles of the source drive lines S of the display drive chip are smaller, the wiring of the source drive lines S becomes more difficult, the source drive lines S occupy a larger region of the non-display region 310 during layout, and thus a low bezel become wider, which is not conducive to increasing the screen-to-body ratio.

The present disclosure provides a pixel drive circuit 100 and a display panel 1000, which can reduce a region occupied by a non-display region 310, narrow the bezel, and reduce the difficulty in wiring.

Referring to FIG. 1, a display panel 1000 includes a display drive chip 200 and a pixel drive circuit 100. The display panel 1000 has a display region 300 and a non-display region 310 (also referred to as "peripheral wiring region" or "peripheral region") surrounding the display region 300. The non-display region 310 includes a first side region 410 on one side of the display region 300, a second side region 420 on the other side of the display region 300, and a bottom region 430 at the bottom of the display region 300. The display drive chip 200 is disposed in the bottom region 430. A part of the pixel drive circuit 100 is disposed in the non-display region 310, and the other part of the pixel drive circuit 100 is disposed in the display region 300 and electrically connected to pixel units 10.

Referring to FIG. 1, the pixel drive circuit 100 includes multiple columns of pixel units 10, multiple data lines s, multiple source drive lines S, and multiple switch assemblies K2.

Referring to FIG. 1, the multiple columns of pixel units 10 are arranged in a row direction D2. In other words, the multiple pixel units 10 are arranged in an array of multiple rows and multiple columns. The pixel units 10 of the display region 300 can also be referred to as "multiple rows of pixel units 10", and the multiple rows of pixel units 10 are arranged sequentially in a column direction D1.

Referring to FIG. 1, multiple data lines s are disposed in the display region 300, and the multiple data lines s are spaced apart from one another and extend in the column direction D1, where each data line s is electrically connected to one column of pixel units 10. Further, each pixel unit 10 includes a drive switch tube, each data line s is electrically connected to sources of drive switch tubes of one column of pixel units 10, and each data line s is used for supplying a data voltage to each pixel unit 10 to charge the pixel unit 10 when the drive switch tube of the pixel unit 10 is turned on.

Referring to FIG. 1, the multiple source drive lines S are disposed in the bottom region 430. In this embodiment, the number of source drive lines S is less than the number of data lines s. Generally, the number of source drive lines S is equal to the number of data lines s in existing display technologies. Taking FHD 1920*1080 as an example, both the number of source drive lines S and the number of data lines s are 1920. In this case, pull-out angles of the source drive lines S of the display drive chip 200 become smaller, the wiring of the source drive lines S becomes more difficult, the source drive lines S occupies a larger region of the non-display region 310 during layout, and thus the low bezel becomes wider.

In embodiments of the present disclosure, the number of source drive lines S is designed to be less than the number of data lines s. In this way, the number of source drive lines S is reduced while the resolution is ensured, so that the pull-out angles of the source drive lines S of the display drive chip 200 are not too small, the wiring of the source drive lines S is smooth, the source drive lines S occupy less of the non-display region 310, and thus the width of the bezel is reduced.

Referring to FIG. 1, multiple switch assemblies K2 are disposed in the bottom region 430. A first connection end of each switch assembly K2 is electrically connected to at least one data line s, and a second connection end of each switch assembly K2 is electrically connected to one source drive line S.

Optionally, referring to FIG. 1, each switch assembly K2 is electrically connected to one data line s. In other words, the number of switch assemblies K2 is equal to the number of data lines s. Each switch assembly K2 is disposed between the data line s and the source drive line S electrically connected to the data line.

Optionally, multiple data lines s can be electrically connected to different source drive lines S through the same switch assembly K2.

Optionally, at least two data lines s are electrically connected to the same source drive line S through different switch assemblies K2. Further, multiple data lines s are electrically connected to the same source drive line S through different switch assemblies K2. In this way, when one row of pixel units 10 is turned on, different switch assemblies K2 can be controlled to be ON or in an off-state ("OFF"), and thus each data line s can input the data voltage to the one row of pixel units 10 turned-on. Therefore, the pixel units 10 are charged row by row, and the same source drive line S is prevented from inputting the same data voltage to different pixel units 10.

The number of data lines s electrically connected to the same source drive line S through different switch assemblies K2 is not limited in the present disclosure. For example, the number of data lines s electrically connected to the same source drive line S through different switch assemblies K2 can be 2, 3, 4, 5, etc., so that the multiple data lines s can reuse (in other words, share) the same source drive line S.

The pixel drive circuit 100 provided in embodiments of the present disclosure has the following designs. Multiple columns of pixel units 10 are arranged in the row direction D2. Multiple data lines s are spaced apart from one another and extend in the column direction D1, where each data line s is electrically connected to one column of pixel units 10. The number of source drive lines S is less than the number of data lines s. A first connection end of each switch assembly K2 is electrically connected to at least one data line s, a second connection end of each switch assembly K2 is electrically connected to one source drive line S, and at least two data lines s are electrically connected to the same source drive line through different switch assemblies K2. In this way, multiple data lines can reuse one source drive line S, which reduces the number of source drive lines S, so that pull-out angles of the source drive lines S of the display drive chip 200 are not too small, the wiring layout of scan drive lines S is improved, the region occupied by the non-display region 310 is reduced, the bezel is narrowed, and the difficulty in wiring is reduced.

Figure 2:
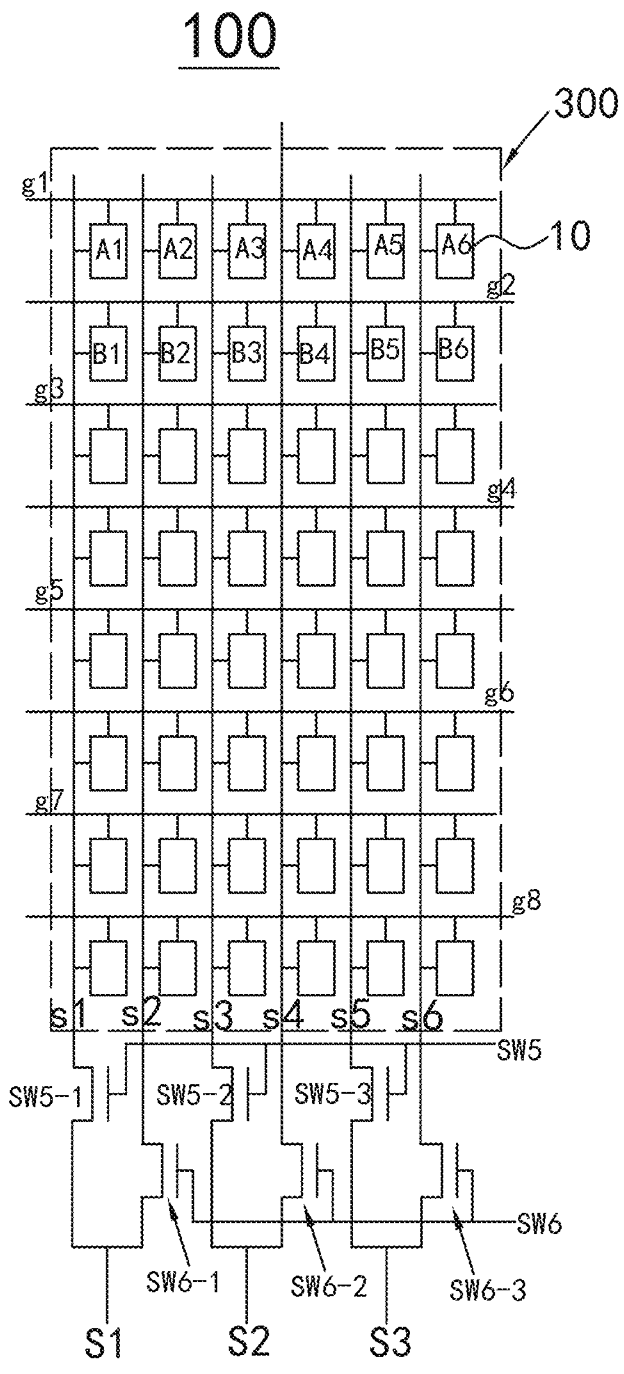
FIG. 2 is a schematic structural diagram of a pixel drive circuit provided in embodiments of the present disclosure.

Optionally, referring to FIG. 1 and FIG. 2, each source drive line S is electrically connected to at least two data lines s in adjacent columns. A source drive line S is electrically connected to multiple data line s in adjacent columns. One source drive line S is electrically connected to at least two data line s in adjacent columns. Optionally, each source drive line S is electrically connected to at least two data line s in adjacent columns.

For example, each source drive line S is electrically connected to two data line s in adjacent columns. A first column of data line (e.g., a first data line s1 illustrated in FIG. 2) and a second column of data line (e.g., a second data line s2 illustrated in FIG. 2) are electrically connected to a first source drive line S1 through two switch assemblies K2, a third column of data line (a third data line s3) and a fourth column of data line (a fourth data line s4) are electrically connected to a second source drive line S2 through two switch assemblies K2, a fifth column of data line (a fifth data line s5) and a sixth column of data line (a sixth data line s6) are electrically connected to a third source drive line S3 through two switch assemblies K2, and so on.

In this embodiment, each source drive line S is designed to be electrically connected to at least two data lines s in adjacent columns. In this way, multiple source drive lines S do not cross with multiple data lines s in the bottom region 430, thereby avoiding interference between signal lines and inconvenience during wiring layout.

Optionally, referring to FIG. 2, multiple adjacent data lines s electrically connected to the same source drive line S include the first data line s1 (for example, the first data line s1 is the first data line) and the second data line s2 (for example, the second data line s2 is the second data line). Multiple switch assemblies K2 include at least a first sub-switch SW5-1 and a second sub-switch SW6-1. A second connection end of the first sub-switch SW5-1 and a second connection end of the second sub-switch SW6-1 are electrically connected to the same source drive line S. A first connection end of the first sub-switch SW5-1 is electrically connected to the first data line s1, and a first connection end of the second sub-switch SW6-1 is electrically connected to the second data line s2. In this way, with the on-off of the first sub-switch SW5-1, the source drive line S can be controlled to input a corresponding data voltage to corresponding pixel units 10 through the first data line s1; or with the on-off of the second sub-switch SW6-1, the source drive line S can be controlled to input a corresponding data voltage to corresponding pixel units 10 through the second data line s2. The state of the first sub-switch SW5-1 is opposite to the state of the second sub-switch SW6-1. For example, when the first sub-switch SW5-1 is ON, the second sub-switch SW6-1 is OFF; and when the second sub-switch SW6-1 is OFF, the first sub-switch SW5-1 is ON. In this way, the source drive line S can input the data voltage to the first data line s1 or the second data line s2.

A difference between the present disclosure and the related art is as follows. In the related art, each source drive line S generally supplies one data voltage during a row scanning period, while in the present disclosure, each source drive line S supplies multiple data voltages during a row scanning period, and the multiple data voltages are respectively supplied to different data lines s through on-off of multiple switch assemblies K2.

Figure 3:
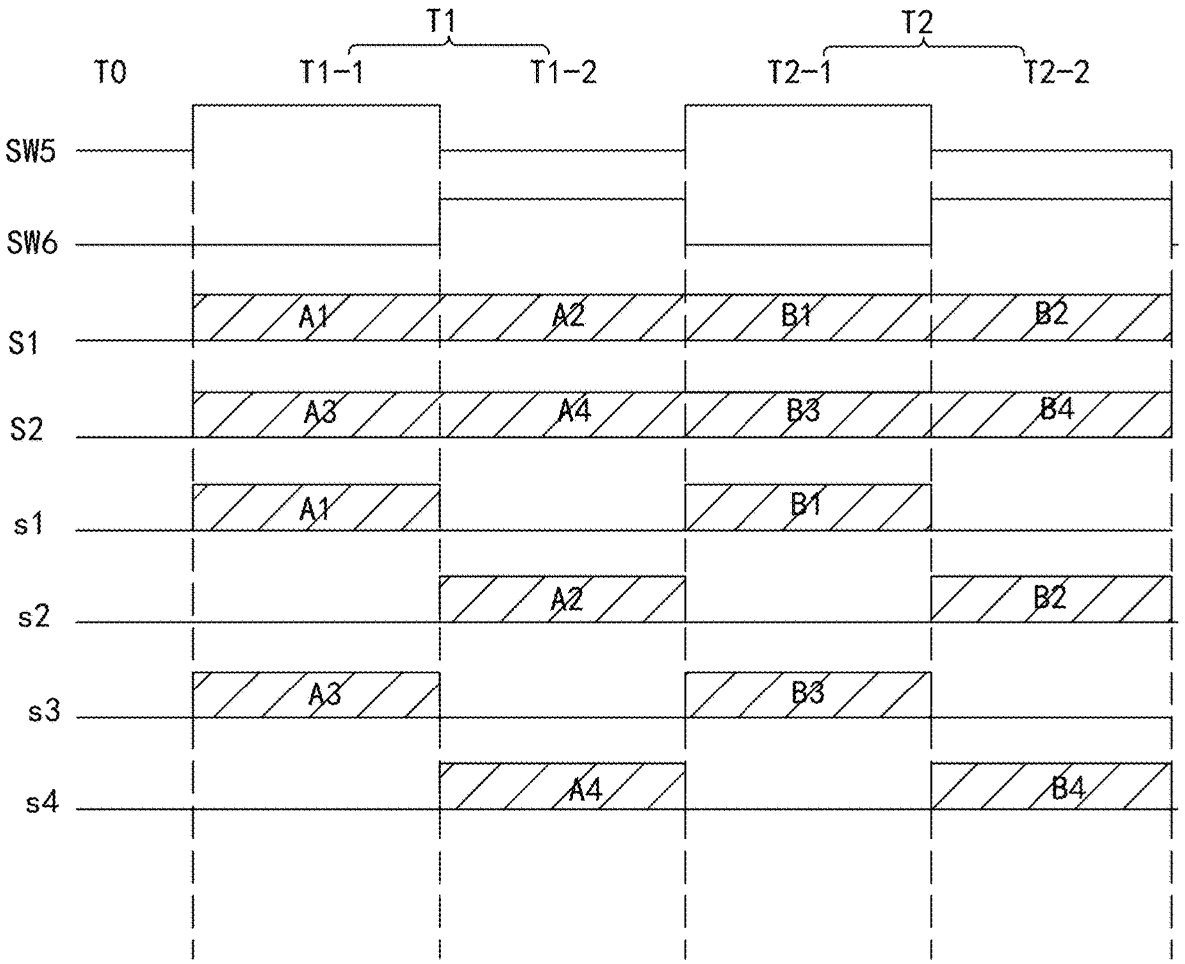
FIG. 3 is a timing diagram of a pixel driving circuit provided in embodiments of the present disclosure.

Specifically, referring to FIGS. 2 and 3, a one-row scanning time T1 includes at least a first period T1-1 and a second period T1-2. During the first period T1-1, pixel units 10 in the n-th row are configured to be ON, the first sub-switch SW5-1 is configured to conduct a source drive line S with the first data line s1, and the source drive line S is configured to supply a first data voltage to the first data line s1. During the second period T1-2, the pixel units 10 in the n-th row are configured to be ON, the second sub-switch SW6-1 is configured to conduct the source drive line S with the second data line s2, and the source drive line S is configured to supply a second data voltage to the second data line s2.

The electronic paper display panel 1000 has a relatively low refresh rate, and the display is not affected even if the source drive line S outputs data voltages to different data lines s during a one-row scanning time.

For the display panel 1000 with a high refresh rate, such as a mobile phone, a computer, a television, etc., the charging rate of the pixel unit 10 can be increased and the switching rate of the switch assembly K2 can be increased as follows, so as to ensure that charging is performed at least twice during a one-row scanning time.

Optionally, the pixel unit 10 includes a drive switch tube, and the drive switch tube is a thin-film transistor (TFT). Optionally, the drive switch tube is designed to have a relatively high carrier mobility. In an embodiment, the material of a channel layer of the TFT includes an amorphous oxide (e.g., GZO) containing indium, gallium, and zinc. Generally, the material of the channel layer of the TFT is amorphous silicon (a-Si). The carrier mobility of the IGZO-TFT is 20 to 30 times that of the a-Si, which can greatly improve the charging and discharging rate of the TFT to a pixel electrode and improve the response speed of the pixel unit 10, so that charging is performed at least twice during a one-row scanning time.

Optionally, referring to FIG. 2, during a one-row scanning time, the first sub-switch SW5-1 needs to be turned off once, and the second sub-switch SW6-1 needs to be turned on once. In this embodiment, the switch assembly K2 is designed to be relatively large to improve the driving capability of the switch assembly K2, thereby improving the fast response capability of the switch assembly K2. For example, the switch assembly K2 is a TFT component, and a channel area formed by a gate width and a channel length of the TFT component is increased to improve the driving capability of the switch assembly K2, thereby improving the fast response capability of the switch assembly K2.

Optionally, for a liquid crystal display (LCD) display panel 1000, a liquid crystal molecular layer in the LCD display panel 1000 is made of a liquid crystal material with an ultra-low viscous coefficient, so as to improve the response speed of the liquid crystal, reduce the response time of the liquid crystal, and further accelerate the charging speed of the pixel unit 10.

Optionally, referring to FIGS. 1 and 2, the pixel drive circuit 100 further includes at least one first control line SW5 and at least one second control line SW6. The first control line SW5 is electrically connected to a control end of the first sub-switch SW5-1, and the second control line SW6 is electrically connected to the control end of the second sub-switch SW6-1. At least one first control line SW5 electrically connected to different source drive lines S are electrically connected, and at least one second control line SW6 electrically connected to different source drive lines S are electrically connected.

For example, each source drive line S is electrically connected to the first data line s1 through the first sub-switch SW5-1 and is electrically connected to the second data line s2 through the second sub-switch SW6-1, the first control line SW5 is electrically connected to control ends of all the first sub-switches SW5-1 electrically connected to the source drive lines S, and the second control line SW6 is electrically connected to control ends of all the second sub-switches SW6-1 electrically connected to the source drive lines S. In this way, the number of control lines in the bottom region 430 can be greatly reduced. For example, only two control lines (the first control line SW5 and the second control line SW6) are needed in the bottom region 430 to realize the control of all the switch assemblies K2.

An end of the first control line SW5 away from the first sub-switch SW5-1 and an end of the second control line SW6 away from the second sub-switch SW6-1 are electrically connected to the display drive chip 200. A decreased number of first control lines SW5 and a decreased number of second control lines SW6 leads to a decreased number of control lines pulled out from the display drive chip 200, so that a region occupied by the first control line SW5 and the second control line SW6 in the bottom region 430 can be reduced, and the difficulty in laying out the first control line SW5 and the second control line SW6 can be reduced.

Referring to FIG. 1 and FIG. 2, the pixel drive circuit 100 further includes multiple scan lines g and multiple scan drive lines G.

Multiple scan lines g are disposed in the display region 300, and the multiple scan lines g are spaced apart from one another and extend in the row direction D2, where each scan line g is electrically connected to one row of pixel units 10. Further, each pixel unit 10 includes a drive switch tube, each scan line g is electrically connected to gates of drive switch tubes of one row of pixel units 10, and each scan line g is used for providing a turn-on signal which drives the drive switch tube of the pixel unit 10 to be turned on, so that the data voltage is input into the pixel unit 10 to charge the pixel unit 10. Multiple scan drive lines G are disposed in the non-display region 310.

Generally, in the related art, taking FHD 1920*1080 as an example, since a single display drive chip 200 is electrically connected to a scan line g of a 540 signal channel, two display drive chips 200 are needed to drive scan lines g and pixel units 10 in odd-numbered rows and scan lines g and pixel units 10 in even-numbered rows, respectively, which increases the cost of the display drive chip 200. Output ends of the scan drive lines G of the display drive chip 200 are output from two sides (the left and the right) of the display drive chip 200, and the difficulty in designing the display panel 1000 is increased. In particular, at pull-out positions of scan drive lines G at the left side and the right side of the display drive chip 200, as the number of scan drive lines G increases, the scan drive lines G are closer to the edges of the display panel 1000, pull-out angles of the scan drive lines G become smaller, and thus the wiring of the scan drive lines G becomes more difficult. When the number of scan drive lines G is increased to a certain extent, the scan drive lines G at the two sides of the display drive chip 200 cannot be pulled out, and pull-out angles of signal lines can only be improved by increasing the width of the low bezel. However, as such, the width of the low bezel is increased, the utilization rate of actual display is reduced, and the aesthetic appearance of the product is greatly reduced.

In the present embodiment, the number of scan drive lines G is designed to be less than the number of scan lines g. Generally, the number of scan drive lines G is equal to the number of scan lines g in existing display technologies. Taking FHD 1920*1080 as an example, both the number of scan drive lines G and the number of scan lines g are 1080. In this case, pull-out angles of the scan drive lines G at the left side and the right side of the display drive chip 200 become smaller, the wiring of the scan drive lines G becomes more difficult, the scan drive lines G occupy a larger region of the non-display region 310 during layout, and thus the low bezel and the side bezel become wider.

In embodiments of the present disclosure, the number of scan drive lines G is designed to be less than the number of scan lines g. In this way, the number of scan drive lines G is reduced while the resolution is ensured, so that the pull-out angles of the scan drive lines G from the left side and the right side of the display drive chip 200 are not too small, the wiring of the scan drive lines G is smooth, the scan drive lines G occupy less of the non-display region 310, and thus the width of the bezel is reduced.

Figure 4:
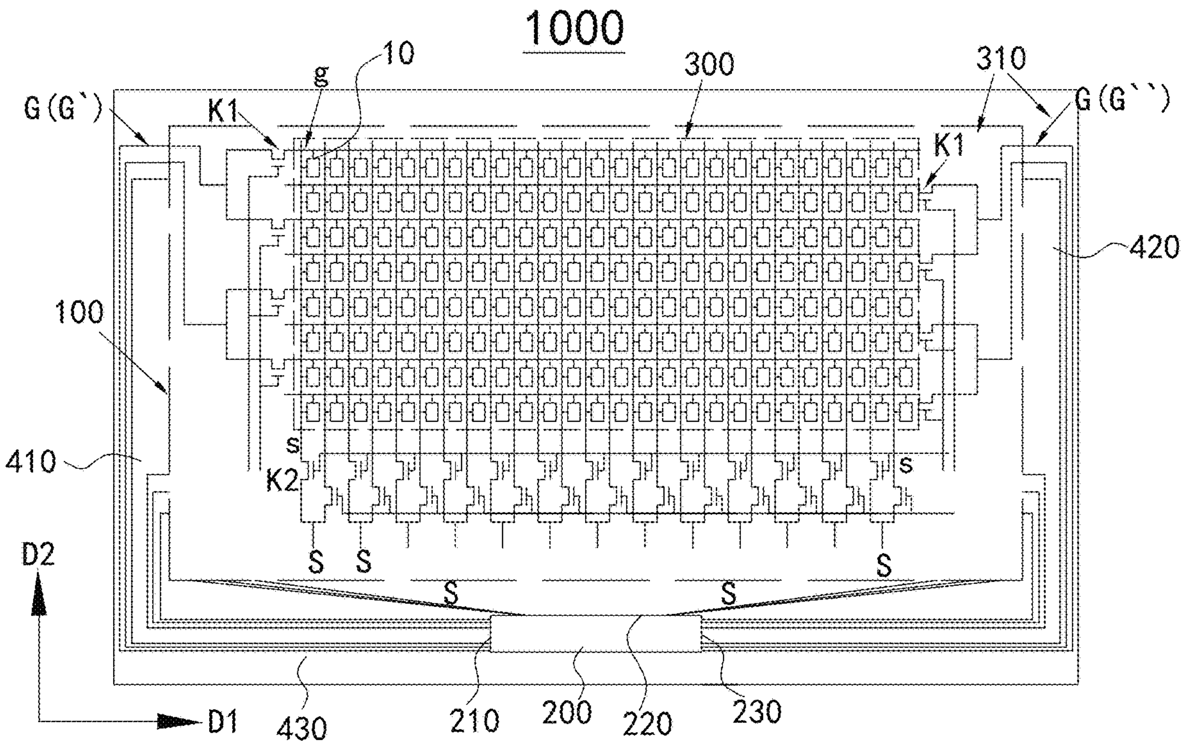
FIG. 4 is a schematic structural diagram of a display panel provided in Embodiment 1 of the present disclosure.

Referring to FIG. 4, the pixel drive circuit 100 further includes multiple switch units K1, where the multiple switch units K1 are disposed in the non-display region 310. A first connection end of each switch unit K1 is electrically connected to at least one scan line g, and a second connection end of each switch unit K1 is electrically connected to one scan drive line G.

Optionally, referring to FIG. 4, each switch unit K1 is electrically connected to one scan line g. In other words, the number of switch assemblies K1 is equal to the number of scan lines g. Each switch unit K1 is disposed between the scan line g and the scan drive line G electrically connected to the scan line g.

Optionally, the multiple scan lines g can be electrically connected to different scan drive lines G through the same switch unit K1.

Figure 5:
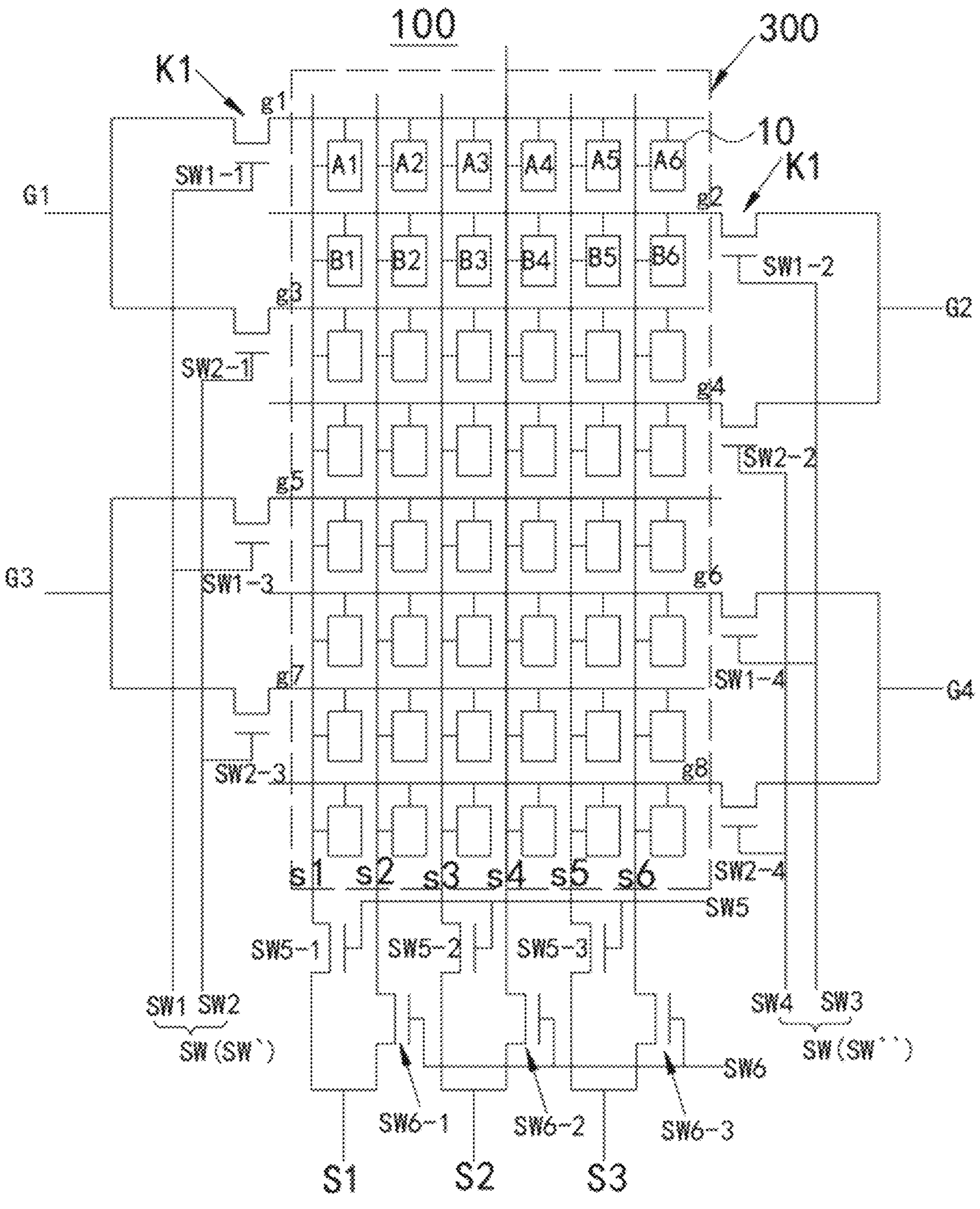
FIG. 5 is a schematic structural diagram of a pixel drive circuit provided in Embodiment 1 of the present disclosure.

Optionally, referring to FIG. 4 and FIG. 5, scan lines g are electrically connected to the same scan drive line G through different switch units K1. Further, multiple scan lines g are electrically connected to the same scan drive line G through different switch units K1. In this way, when a high level is input at the same scan drive line G, different switch units K1 can be controlled to be ON or OFF, and thus scan lines g can be scanned row by row. Therefore, the pixel units 10 are charged row by row, and the drive switch tubes of the pixel units 10 will not be turned on by the scan lines g in different rows simultaneously.

The number of scan lines g electrically connected to the same scan drive line G through different switch units K2 is not limited in the present disclosure. For example, the number of scan lines g electrically connected to the same scan drive line G through different switch units K2 can be 2, 3, 4, 5, etc., so that multiple scan lines g can reuse the same scan drive line G.

The pixel drive circuit 100 provided in embodiments of the present disclosure has the following designs. Multiple rows of pixel units 10 are arranged in the column direction D1. Multiple scan lines g are spaced apart from one another and extend in the row direction D2, where each scan line g is electrically connected to one row of pixel units 10. The number of scan drive lines G is less than the number of scan lines g. A first connection end of each switch unit K1 is electrically connected to at least one scan line g, a second connection end of each switch unit K1 is electrically connected to one scan drive line G, and at least two scan lines g are electrically connected to a same scan drive line G through different switch units K1. In this way, the wiring layout of the scan drive lines G is improved, and thus the width of the bezel is reduced while high resolution is ensured.

Multiple data lines s are in different layers from multiple scan lines g. Orthogonal projections of any two adjacent data lines s and orthogonal projections of any two adjacent scan lines g in a thickness direction of the display panel 1000 cooperatively define one pixel-region, and each pixel unit 10 is disposed in one pixel region.

Optionally, referring to FIG. 4, multiple scan drive lines G include multiple first scan drive lines G' and multiple second scan drive lines G". The multiple first scan drive lines G' are disposed on one side of multiple rows of pixel units 10, and the multiple second scan drive lines G" are disposed on the other side of the multiple rows of pixel units 10.

Optionally, referring to FIG. 4, a part of the multiple scan drive lines G (the first scan drive lines G') is disposed in the first side region 410 and extends into the bottom region 430 to be electrically connected to a first side (or referred to as a first connection surface) of the display drive chip 200. The other part of the multiple scan drive lines G (the second scan drive lines G") is disposed in the second side region 420 and extends into the bottom region 430 to be electrically connected to a second side (or referred to as a second connection surface) of the display drive chip 200. In this way, the multiple scan drive lines G can be disposed on two sides of the multiple rows of pixel units 10, respectively, and the first side region 410 and the second side region 420 on two sides of the display region 300 are utilized for the wiring layout of the scan drive lines G.

In the related art, a first drive chip and a second drive chip need to be arranged in the bottom region 430 of the display panel 1000, where the first drive chip and the second drive chip are spaced apart from each other in the row direction D2. Due to a large number of scan drive lines G and a large number of source drive lines S, the wiring layout of the scan drive lines G is needed at the left side and the right side of the first drive chip. The scan drive lines G at the right side of the first drive chip need to bypass the bottom side of the first drive chip (one side of the first drive chip away from the display region 300) to the first side region 410. The wiring layout of the scan drive lines G is needed at both the left side and the right side of the second drive chip, and the scan drive lines G at the left side of the second drive chip need to bypass the bottom side of the second drive chip (one side of the second drive chip away from the display region 300) to the second side region 420. In this way, a certain width between the bottom side of the display drive chip 200 and the edge of the display panel 1000 is required for wiring, resulting in an increased width of the bottom bezel of the display panel 1000 and a decreased proportion of the display region 300.

In this embodiment, every two scan lines g are electrically connected to the same scan drive line G through two switch units K1, and every two data lines s are electrically connected to the same source drive line S through two switch assemblies K2. In this way, the number of scan drive lines G is reduced by half compared to that in the related art, and the number of source drive lines S is reduced by half compared to that in the related art. Therefore, only one display drive chip 200 is required.

Referring to FIG. 4, the wiring layout of scan drive lines G is arranged on a first connection surface 210 of the display drive chip 200, the wiring layout of source drive lines S is arranged on a second connection surface 220 of the display drive chip 200, and the wiring layout of the scan drive lines G is arranged on the third connection surface 230 of the display drive chip 200. In this way, one display drive chip 200 is omitted and the cost is reduced. In addition, the certain width between the bottom side of the display drive chip 200 and the edge of the display panel 1000 is not required for wiring, the width of the bottom bezel of the display panel 1000 is reduced, and the proportion of the display region 300 is increased.

Certainly, if every three scan lines g are electrically connected to the same scan drive line G through three switch units K1, the number of scan drive lines G is reduced to ⅓ of the number of scan drive lines G in the related art. If every four scan lines g are electrically connected to the same scan drive line G through four switch units K1, the number of scan drive lines G is reduced to ¼ of the number of scan drive lines G in the related art. A similar principle is applicable to the source drive lines S.

Optionally, the number of scan drive lines G in the first side region 410 can be equal or nearly equal to the number of scan drive lines G in the second side region 420. For the display panel 1000, the width of the first side region 410 and the width of the second side region 420 at two sides of the display region 300 of the display panel 1000 are more symmetrical, and the appearance of the display panel 1000 is better.

Optionally, referring to FIG. 4, a part of the multiple switch units K1 is disposed in the first side region 410, and the other part of the multiple switch units K1 is disposed in the second side region 420. Since the second connection end of the switch unit K1 needs to be electrically connected to the scan drive line G, in the present disclosure, the scan drive lines G on two sides of the display region 300 do not across the display region 300, so that the layout thereof is simple, convenient, and highly operable.

Certainly, in other embodiments, all the switch units K1 can be arranged on the same side of the display region 300.

Figure 6:
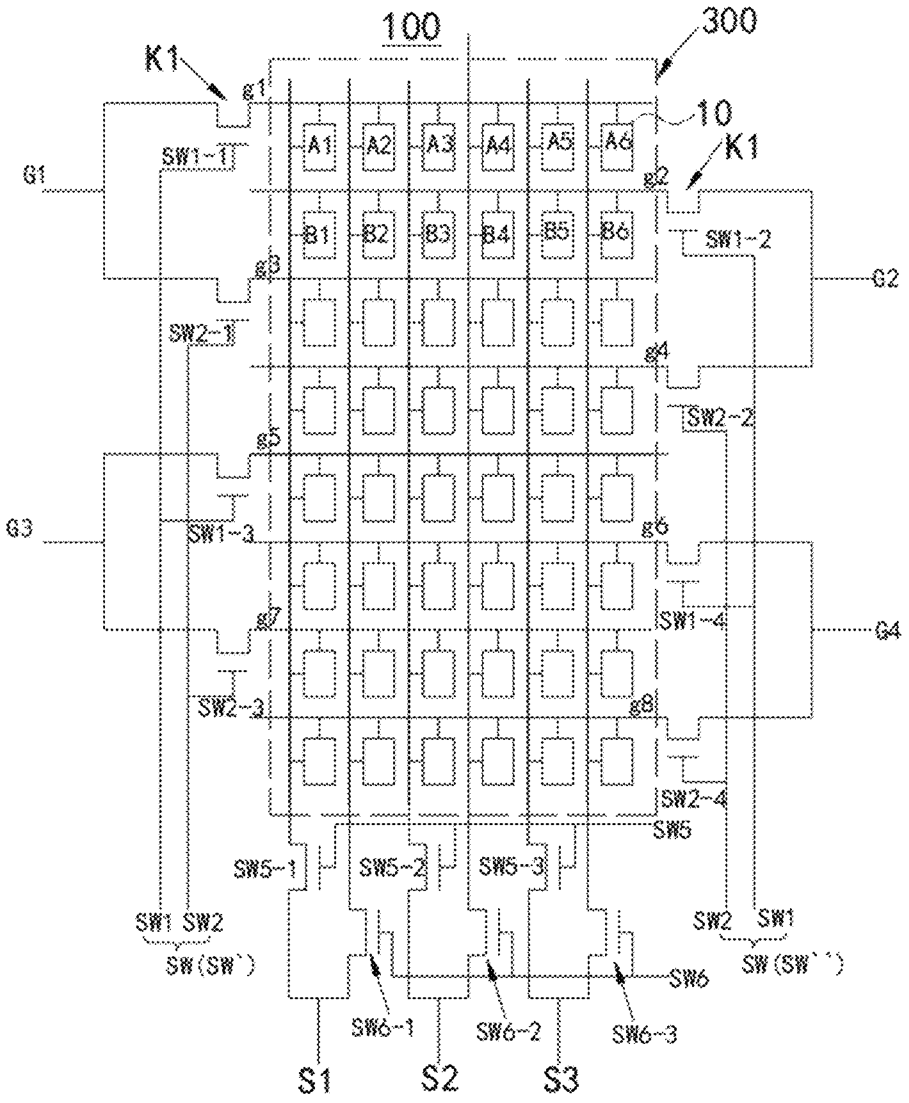
FIG. 6 is a schematic structural diagram of a pixel drive circuit provided in Embodiment 2 of the present disclosure.

In a first optional embodiment, referring to FIG. 5 and FIG. 6, the first scan drive lines G' are electrically connected to the scan lines g in odd-numbered rows, and the second scan drive lines G" are electrically connected to the scan lines g in even-numbered rows. Further, one first scan drive line G' is electrically connected to at least two scan lines g in odd-numbered rows, and one second scan drive line G" is electrically connected to at least two scan lines g in even-numbered rows. Optionally, each first scan drive line G' is electrically connected to at least two scan lines g in odd-numbered rows, and each second scan drive line G" is electrically connected to at least two scan lines g in even-numbered rows.

For example, each first scan drive line G' is electrically connected to two scan lines g in odd-numbered rows, and each second scan drive line G" is electrically connected to two scan lines g in even-numbered rows. The first row of scan line g1 and the third row of scan line g3 are electrically connected to the first first-scan-drive-line G1 through two switch units K1, the second row of scan line g2 and the fourth row of scan line g4 are electrically connected to the first second-scan-drive-line G2 through two switch units K1, the fifth row of scan line g5 and the seventh row of scan line g7 are electrically connected to the second first-scan-drive-line G3 through two switch units K1, the sixth row of scan line g6 and the eighth row of scan line g8 are electrically connected to the second second-scan-drive-line G4 through two switch units K1, and so on.

Figure 7:
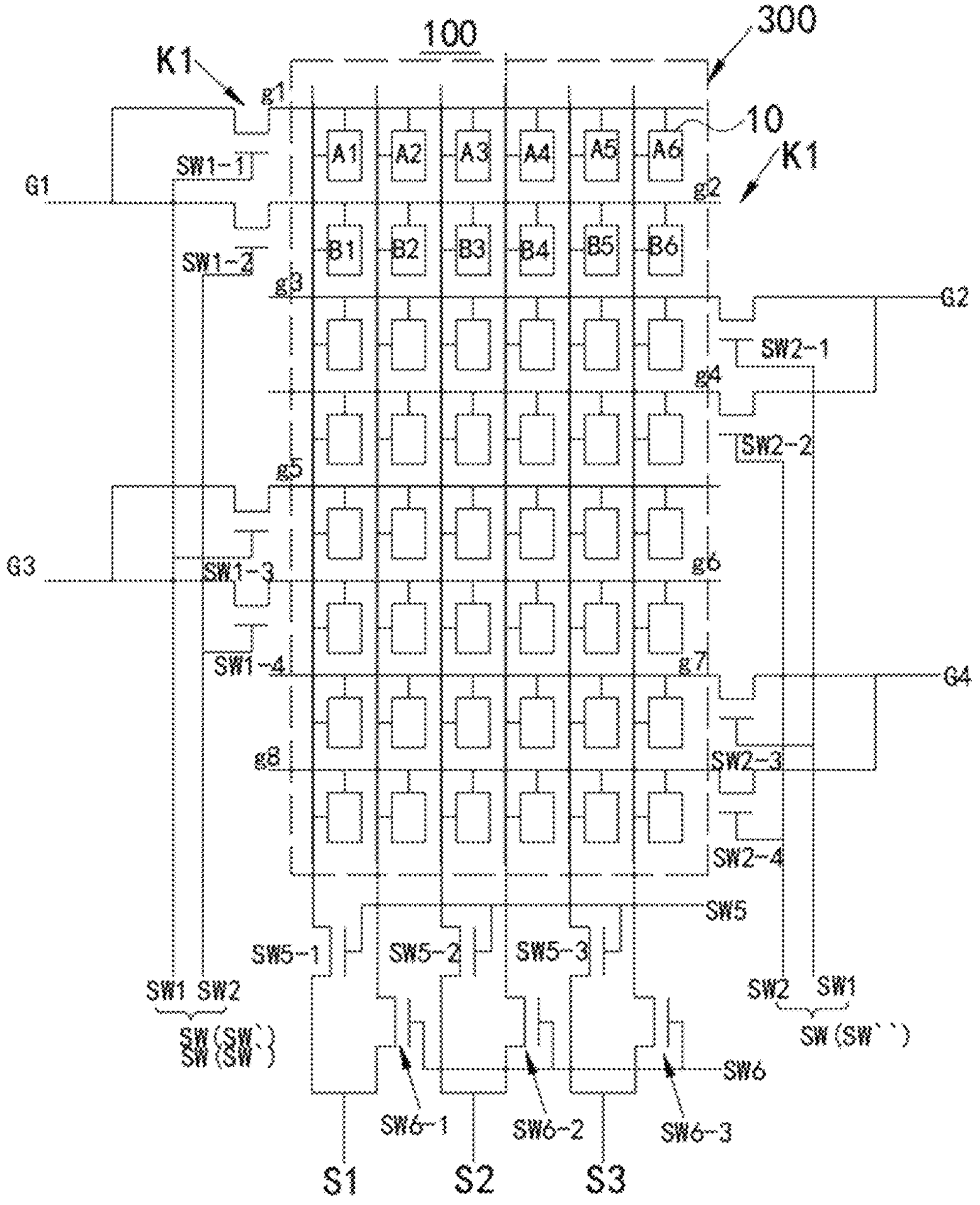
FIG. 7 is a schematic structural diagram of a pixel drive circuit provided in Embodiment 3 of the present disclosure.

In a second optional embodiment, referring to FIG. 7, the first scan drive lines G' are electrically connected to scan lines g in multiple adjacent rows, and the second scan drive lines G" are electrically connected to scan lines g in multiple adjacent rows. One first scan drive line G' is electrically connected to at least two scan lines g in adjacent rows, and one second scan drive line G" is electrically connected to at least two scan lines g in adjacent rows. Optionally, each first scan drive line G' is electrically connected to at least two scan lines g in adjacent rows, and each second scan drive line G" is electrically connected to at least two scan lines g in adjacent rows.

For example, each first scan drive line G' is electrically connected to two scan lines g in adjacent rows, and each second scan drive line G" is electrically connected to two scan lines g in adjacent rows. The first row of scan line g1 and the second row of scan line g2 are electrically connected to the first first-scan-drive-line G1 through two switch units K1, the third row of scan line g3 and the fourth row of scan line g4 are electrically connected to the first second-scan-drive-line G2 through two switch units K1, the fifth row of scan line g5 and the sixth row of scan line g6 are electrically connected to the second first-scan-drive-line G3 through two switch units K1, the seventh row of scan line g7 and the eighth row of scan line g8 are electrically connected to the second second-scan-drive-line G4 through two switch units K1, and so on.

Optionally, referring to FIG. 5 to FIG. 7, the pixel drive circuit 100 further includes multiple switch control lines SW, where each switch control line SW is electrically connected to a control end of at least one switch unit K1.

For example, each switch control line SW is electrically connected to a control end of one switch unit K1. Optionally, the first row of scan line g1 and the third row of scan line g3 are electrically connected to the first first-scan-drive-line G1 through a first switch unit SW1-1 and a third switch unit SW2-1, respectively. The second row of scan line g2 and the fourth row of scan line g4 are electrically connected to the first second-scan-drive-line G2 through a second switch unit SW1-2 and a fourth switch unit SW2-2, respectively. The fifth row of scan line g5 and the seventh row of scan line g7 are electrically connected to the second first-scan-drive-line G3 through a fifth switch unit SW1-3 and a seventh switch unit SW2-3, respectively. The sixth row of scan line g6 and the eighth row of scan line g8 are electrically connected to the second second-scan-drive-line G4 through a sixth switch unit SW1-4 and an eighth switch unit SW2-4, respectively. The first switch unit SW1-1, the third switch unit SW2-1, the fifth switch unit SW1-3, and the seventh switch unit SW2-3 can be disposed between the display region 300 and the first scan drive line G'. The second switch unit SW1-2, the fourth switch unit SW2-2, the sixth switch unit SW1-4, and the eighth switch unit SW2-4 can be disposed between the display region 300 and the second scan drive line G". The switch control lines SW electrically connected to control ends of the first switch unit SW1-1, the third switch unit SW2-1, the fifth switch unit SW1-3, the seventh switch unit SW2-3, the second switch unit SW1-2, the fourth switch unit SW2-2, the sixth switch unit SW1-4, and the eighth switch unit SW2-4 are individually arranged and electrically connected to the display drive chip 200.

In this embodiment, the number of switch control lines SW is equal to the number of switch units K1. The other ends of the switch control lines SW are electrically connected to the display drive chip 200, and the display drive chip 200 individually controls each switch unit K1 through the switch control lines SW.

For another example, each switch control line SW is electrically connected to control ends of multiple switch units K1, and optionally, at least two switch units K1 electrically connected to different scan drive lines G are electrically connected to the same switch control line SW.

In this embodiment, the number of switch control lines SW is less than the number of switch units K1. The other ends of the switch control lines SW are electrically connected to the display drive chip 200, so that the wiring of the switch control wires SW can be reduced, and ports on the display drive chip 200 required for the switch control lines SW can be reduced.

Optionally, referring to FIG. 5 to FIG. 7, the pixel drive circuit 100 further includes multiple switch control lines SW. The multiple switch control lines SW include multiple first switch control lines SW' and multiple second switch control lines SW". The multiple first switch control lines SW' and the multiple first scan drive lines G' are disposed on one side of multiple rows of pixel units 10, and the multiple second switch control lines SW" and the multiple second scan drive lines G" are disposed on the other side of the multiple rows of pixel units 10. Control ends of multiple switch units K1 electrically connected to different first scan drive lines G' are electrically connected to the same first switch control line SW; and/or control ends of multiple switch units K1 electrically connected to different second scan drive lines G" are electrically connected to the same second switch control line SW".

For example, each switch control line SW is electrically connected to a control end of one switch unit K1. Optionally, the first row of scan line g1 and the third row of scan line g3 are electrically connected to the first first-scan-drive-line G1 through the first switch unit SW1-1 and the third switch unit SW2-1, respectively. The second row of scan line g2 and the fourth row of scan line g4 are electrically connected to the first second-scan-drive-line G2 through the second switch unit SW1-2 and the fourth switch unit SW2-2, respectively. The fifth row of scan line g5 and the seventh row of scan line g7 are electrically connected to the second first-scan-drive-line G3 through the fifth switch unit SW1-3 and the seventh switch unit SW2-3, respectively. The sixth row of scan line g6 and the eighth row of scan line g8 are electrically connected to the second second-scan-drive-line G4 through the sixth switch unit SW1-4 and the eighth switch unit SW2-4, respectively. The first switch unit SW1-1, the third switch unit SW2-1, the fifth switch unit SW1-3, and the seventh switch unit SW2-3 can be disposed between the display region 300 and the first scan drive line G', and the second switch unit SW1-2, the fourth switch unit SW2-2, the sixth switch unit SW1-4, and the eighth switch unit SW2-4 can be disposed between the display region 300 and the second scan drive line G".

The multiple first switch control lines SW' include a first sub-control line SW1 and a second sub-control line SW2, where the first sub-control line SW1 is electrically connected to the first switch unit SW1-1 and the fifth switch unit SW1-3, and the second sub-control line SW2 is electrically connected to the third switch unit SW2-1 and the seventh switch unit SW2-3.

The multiple second switch control lines SW" include a third sub-control line SW3 and a fourth sub-control line SW4, where the third sub-control line SW3 is electrically connected to the second switch unit SW1-2 and the sixth switch unit SW1-4, and the fourth sub-control line SW4 is electrically connected to the fourth switch unit SW2-2 and the eighth switch unit SW2-4.

In this way, the number of switch control lines SW between the display region 300 and the multiple first scan drive lines G' can be greatly reduced. For example, only two switch control lines SW (the first sub-control line SW1 and the second sub-control line SW2) are needed between the display region 300 and the multiple first scan drive lines G', to control all switch units K1 between the display region 300 and the multiple first scan drive lines G'. In addition, the number of switch control lines SW between the display region 300 and the multiple second scan drive lines G" can be greatly reduced. For example, only two switch control lines SW (the third sub-control line SW3 and the fourth sub-control line SW4) are needed between the display region 300 and the multiple second scan drive lines G", to control all the switch units K1 between the display region 300 and the multiple second scan drive lines G".

Multiple first switch control lines SW electrically connected to the same the first scan drive line G' are electrically connected with multiple second switch control lines SW" electrically connected to the same the second scan drive line G" in one-to-one correspondence.

For example, referring to FIG. 6, the first sub-control line SW1 and the second sub-control line SW2 are arranged between the display region 300 and the multiple first scan drive lines G', and the third sub-control line SW3 and the fourth sub-control line SW4 are arrange between the display region 300 and the multiple second scan drive lines G". The first sub-control line SW1 and the third sub-control line SW3 can be electrically connected to each other and combined into one line to be electrically connected to the display drive chip 200, and the second sub-control line SW2 and the fourth sub-control line SW4 can be electrically connected to each other and combined into one line to be electrically connected to the display drive chip 200. In this way, the number of ports on the display drive chip 200 needed for the switch control lines SW can be greatly reduced. For example, only two ports are needed for electrical connection to the switch control lines SW.

Certainly, in other embodiments, the first sub-control line SW1 and the fourth sub-control line SW4 can be electrically connected to each other and combined into one line to be electrically connected to the display drive chip 200, and the second sub-control line SW2 and the third sub-control line SW3 can be electrically connected to each other and combined into one line to be electrically connected to the display drive chip 200.

Optionally, when multiple scan drive lines G are configured to provide a turn-on signal to each scan line g at different time sequences, first connection ends of multiple switch units K1 electrically connected to the same scan drive line G and second connection ends of the multiple switch units K1 are conducted at different time periods. In this way, the scan lines g are turned on row by row, and pixel units 10 are charged row by row.

In a first embodiment, referring to FIGS. 4 and 5, in this embodiment, two scan lines g reuse one scan drive line G, and the number of scan drive lines G on two sides of multiple rows of pixel units 10 are reduced by half; and two data lines s reuse one source drive line S, and the number of source drive lines S is reduced by half. As a result, the scan drive lines G are output from the left side and the right side of a single display drive chip 200, the source drive lines S are output from one side of the single display drive chip 200 facing the display region 300. As such, requirement of signal lines can be met, the difficulty in wiring is reduced greatly, no space for wiring is needed at the bottom of the display drive chip 200, and thus the low bezel is narrowed.

In this embodiment, the first row of scan line g1 and the third row of scan line g3 are electrically connected to the first first-scan-drive-line G1 through the first switch unit SW1-1 and the third switch unit SW2-1, respectively. The second row of scan line g2 and the fourth row of scan line g4 are electrically connected to the first second-scan-drive-line G2 through the second switch unit SW1-2 and the fourth switch unit SW2-2, respectively. The fifth row of scan line g5 and the seventh row of scan line g7 are electrically connected to the second first-scan-drive-line G3 through the fifth switch unit SW1-3 and the seventh switch unit SW2-3, respectively. The sixth row of scan line g6 and the eighth row of scan line g8 are electrically connected to the second second-scan-drive-line G4 through the sixth switch unit SW1-4 and the eighth switch unit SW2-4, respectively. The first switch unit SW1-1, the third switch unit SW2-1, the fifth switch unit SW1-3, and the seventh switch unit SW2-3 can be arranged between the display region 300 and the first scan drive line G', and the second switch unit SW1-2, the fourth switch unit SW2-2, the sixth switch unit SW1-4, and the eighth switch unit SW2-4 can be arranged between the display region 300 and the second scan drive line G". The first sub-control line SW1 is electrically connected to the first switch unit SW1-1 and the fifth switch unit SW1-3, and the second sub-control line SW2 is electrically connected to the third switch unit SW2-1 and the seventh switch unit SW2-3. The third sub-control line SW3 is electrically connected to the second switch unit SW1-2 and the sixth switch unit SW1-4, and the fourth sub-control line SW4 is electrically connected to the fourth switch unit SW2-2 and the eighth switch unit SW2-4. The first sub-control line SW1, the second sub-control line SW2, the third sub-control line SW3, and the fourth sub-control line SW4 are independent of one another and electrically connected to the display drive chip 200.

The first column of data line (the first data line s1) and the second column of data line (the second data line s2) are electrically connected to the first source drive line S1 through the first sub-switch SW5-1 and the second sub-switch SW6-1, respectively. The third column of data line (the third data line s3) and the fourth column of data line (the fourth data line s4) are electrically connected to the second source drive line S2 through the third sub-switch SW5-2 and the fourth sub-switch SW6-2, respectively. The fifth column of data line (the fifth data line s5) and the sixth column of data line (the sixth data line s6) are electrically connected to the third source drive line S3 through the fifth sub-switch SW5-3 and the sixth sub-switch SW6-3, respectively. Control ends of the first sub-switch SW5-1, the third sub-switch SW5-2, and the fifth sub-switch SW5-3 are electrically connected to the same first sub-control line SW5. Control ends of the second sub-switch SW6-1, the fourth sub-switch SW6-2, and the sixth sub-switch SW6-3 are electrically connected to the same second sub-control line SW6.

Figure 8:
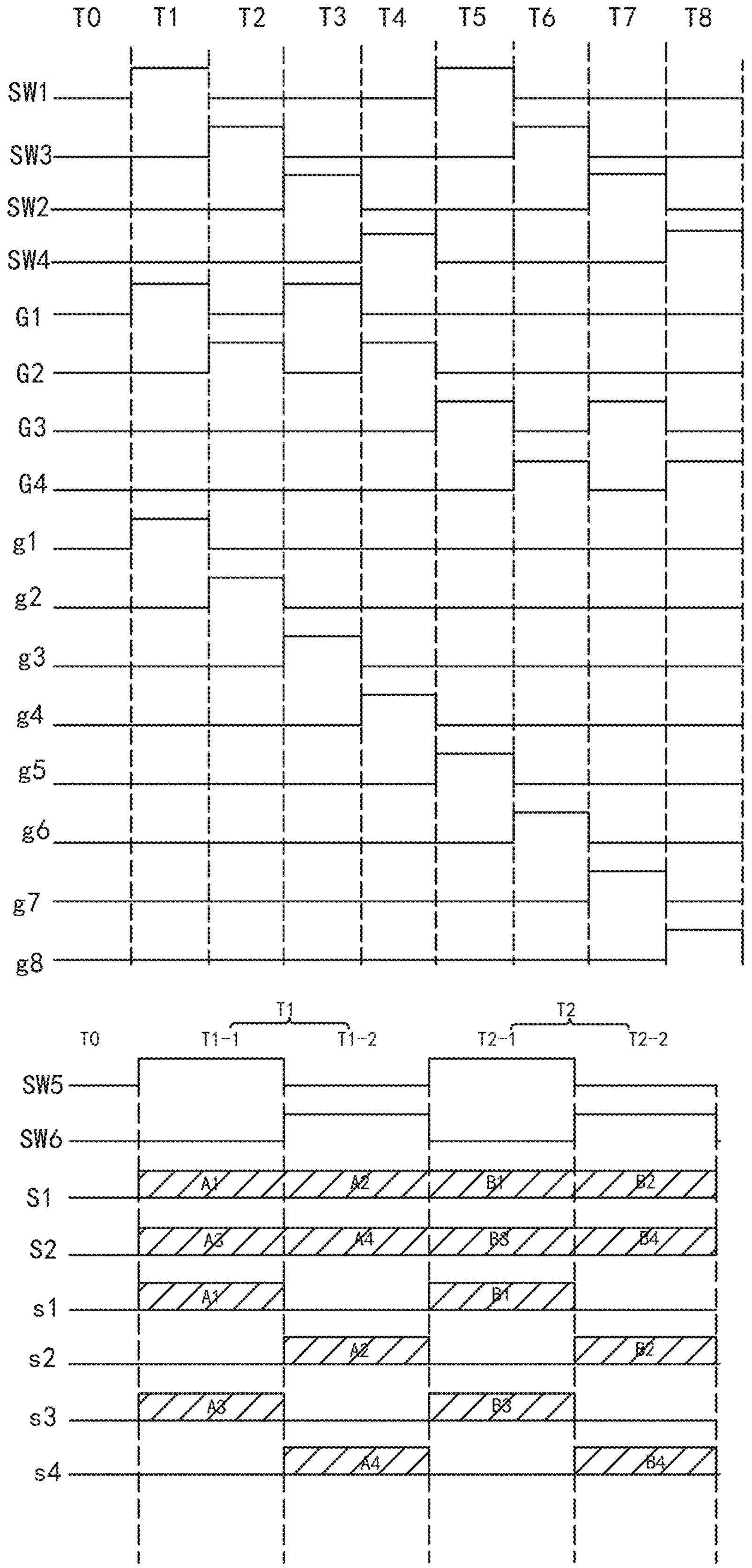
FIG. 8 is a timing diagram of a pixel drive circuit provided in Embodiment 1 of the present disclosure.

Referring to FIG. 8, a drive timing in this embodiment is as follows.

T0 phase: the first sub-control line SW1, the second sub-control line SW2, the third sub-control line SW3, and the fourth sub-control line SW4 each are low-level. Scan drive lines G1 to G540 and source drive lines S1 to S960 each are low-level. Scan signals of scan lines g each are low-level (denoted as lowercase "g"), and data signals of data line s each are low-level (denoted as lowercase "s"), and there is no charging action in this phase.

T1 phase: the first sub-control line SW1 is high-level, and sub control lines SW2 to SW4 each are low-level. The scan drive line G1 is high-level, and the scan drive lines G2 to G4 each are low-level. The first switch unit SW1-1 is turned on, the scan drive line G1 is connected to the scan line g1, the scan line g1 becomes high-level, one row of pixel units 10 electrically connected to the scan line g1 starts to be charged, and the rest of the rows are silent.

T1-1 phase: the first control line SW5 is high-level, the second control line SW6 is low-level, TFTs such as the first sub-switch SW5-1, the third sub-switch SW5-2, and the fifth sub-switch SW5-3, etc., are turned on, and pixels such as A1, A3, and A5 in the first row are charged.

T1-2 phase: the second control line SW6 is high-level, the first control line SW5 is low-level, TFTs such as the second sub-switch SW6-1, the fourth sub-switch SW6-2, and the sixth sub-switch SW6-3, etc., are turned on, and pixels such as A2, A4, and A6 in the first row are charged.

T2 phase: the third sub-control line SW3 is high-level, and the first sub-control line SW1, the second sub-control line SW2, and the fourth sub-control line SW4 each are low-level. The scan drive line G2 is high-level, and the rest are low-level. The second switch unit SW1-2 is turned on, the scan drive line G2 is connected to the scan line g2, the scan line g2 becomes high-level, one row of pixel units 10 electrically connected to the scan line g2 starts to be charged, and the rest of the rows of pixel units 10 are silent.

T2-1 phase: the first control line SW5 is high-level, the second control line SW6 is low-level, TFTs such as the first sub-switch SW5-1, the third sub-switch SW5-2, and the fifth sub-switch SW5-3, etc. are turned on, and pixels such as B1, B3, and B5 in the second row are charged.

T2-2 phase: the second control line SW6 is high-level, the first control line SW5 is low-level, TFTs such as the second sub-switch SW6-1, the fourth sub-switch SW6-2, and the sixth sub-switch SW6-3, etc. are turned on, and pixels such as B2, B4, and B6 in the second row are charged.

T3 phase: the second sub-control line SW2 is high-level, and the first sub-control line SW1, the third sub-control line SW3, and the fourth sub-control line SW4 each are low-level. The scan drive line G1 is high-level, and the rest are low-level. The third switch unit SW2-1 is turned on, the scan drive line G1 is connected to the scan line g3, the scan line g3 becomes high-level, one row of pixel units 10 electrically connected to the scan line g3 starts to be charged, and the rest of the rows of pixel units 10 are silent.

T4 phase: the fourth sub-control line SW4 is high-level, and the first sub-control lines SW1 to SW3 each are low-level. The scan drive line G2 is high-level, and the rest are low-level. The fourth switch unit SW2-2 is turned on, the scan drive line G2 is connected to the scan line g4, the scan line g4 becomes high-level, and one row of pixel units 10 electrically connected to the scan line g4 starts to be charged, and the rest of the rows are silent.

T5 phase: reference can be made to the above signal logic, and charging is started row by row.

In a second embodiment provided in the present disclosure, referring to FIG. 6, two switch control lines SW are omitted compared to the first embodiment. The first sub-control line SW1 and the third sub-control line SW3 can be electrically connected to each other and combined into one line to be electrically connected to the display drive chip 200, and the second sub-control line SW2 and the fourth sub-control line SW4 can be electrically connected to each other and combined into one line to be electrically connected to the display drive chip 200.

Figure 9:
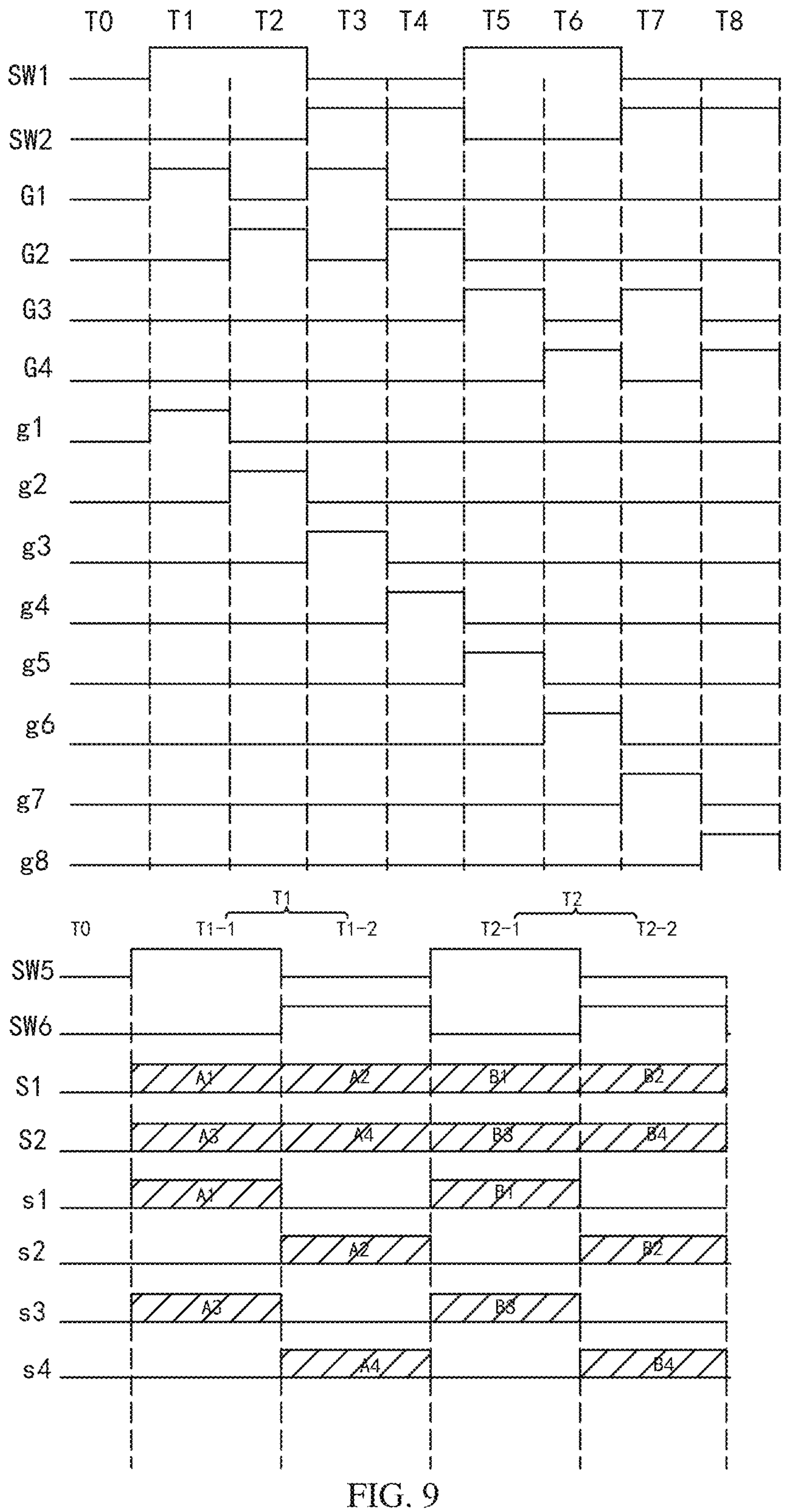
FIG. 9 is a timing diagram of a pixel drive circuit provided in Embodiment 2 of the present disclosure.

Referring to FIG. 9, a drive timing in this embodiment is as follows.

T0 phase: the first sub-control line SW1 and the second sub-control line SW2 each are low-level. The scan drive lines G1 to G540 and the source drive lines S1 to S960 each are low-level. The scan signals of the scan lines g each are low-level (denoted as lowercase scan line g), the data signals of the data lines s each are low-level (denoted as lowercase s), and there is no charging action.

T1 phase: the first sub-control line SW1 is high-level, and the second sub-control line SW2 is low-level. The scan drive line G1 is high-level, and the scan drive lines G2 to G4 each are low-level. The first switch unit SW1-1 is turned on, the scan drive line G1 is connected to the scan line g1, the scan line g1 becomes high-level, and the one row of pixel unit 10 electrically connected to the scan line g1 starts to be charged, and the rest of the rows are silent.

T1-1 phase: the first control line SW5 is high-level, the second control line SW6 is low-level, TFTs such as the first sub-switch SW5-1, the third sub-switch SW5-2, and the fifth sub-switch SW5-3, etc., are turned on, and the pixels such as A1, A3, and A5 in the first row are charged.

T1-2 phase: the second control line SW6 is high-level, the first control line SW5 is low-level, TFTs such as the second sub-switch SW6-1, the fourth sub-switch SW6-2, and the sixth sub-switch SW6-3, etc., are turned on, and the pixels such as A2, A4, and A6 in the first row are charged.

T2 phase: the first sub-control line SW1 remains high-level, and the second sub-control line SW2 is low-level. The scan drive line G2 is high-level, and the rest are low-level. The second switch unit SW1-2 is turned on, the scan drive line G2 is connected to the scan line g2, the scan line g2 becomes high-level, and the one row of pixel units 10 electrically connected to the scan line g2 starts to be charged, and the rest of the rows are silent.

T2-1 phase: the first control line SW5 is high-level, the second control line SW6 is low-level, TFTs such as the first sub-switch SW5-1, the third sub-switch SW5-2, and the fifth sub-switch SW5-3, etc., are turned on, and pixels such as B1, B3, and B5 in the second row are charged.

T2-2 phase: the second control line SW6 is high-level, the first control line SW5 is low-level, TFTs such as the second sub-switch SW6-1, the fourth sub-switch SW6-2, and the sixth sub-switch SW6-3, etc., are turned on, and pixels such as B2, B4, and B6 in the second row are charged.

T3 phase: the second sub-control line SW2 is high-level, and the first sub-control line SW1 is low-level. The scan drive line G1 is high-level, and the rest are low-level. The third switch unit SW2-1 is turned on, the scan drive line G1 is connected to the scan line g3, the scan line g3 becomes high-level, and the one row of pixel units 10 electrically connected to the scan line g3 starts to be charged, and the rest of the rows are silent.

T4 phase: the second sub-control line SW2 remains high-level, and the first sub-control line SW1 is low-level.

The scan drive line G2 is high-level, and the rest are low-level. A TFT switch of the fourth switch unit SW2-2 is turned on, the scan drive line G2 is connected to the scan line g4, the scan line g4 becomes high-level, and the one row of pixel units 10 electrically connected to the scan line g4 starts to be charged, and the rest of the rows are silent.

T5 phase: reference can be made to the above signal logic, and charging can be started row by row.

In the first embodiment and the second embodiment, scan lines in odd-numbered rows and scan lines in even-numbered rows are driven by the left scan drive line and the right scan drive line row by row alternatively, respectively. For example, in FIG. 5, the first row of scan line g1 is driven by scan drive line G1, the second row of scan line g2 is driven by scan drive line G2, the third row of scan line g3 is driven by scan drive line G1, and the fourth row of scan line g4 is driven by scan drive line G2, the fifth row of scan line g5 is driven by scan drive line G3, the sixth row of scan line g6 is driven by scan drive line G4, the seventh row of scan line g7 is driven by scan drive line G3, the eighth line g8 is driven by scan drive line G4, and so on. However, referring to FIG. 7, in the pixel drive circuit 100 provided in the third embodiment of the present disclosure, two scan lines in adjacent rows are driven by one scan drive line. In other words, the first two rows of scan lines g1 and g2 are driven by the left scan drive line G1, the third row and the fourth row of scan lines g3 and g4 are driven by the right scan drive line G2, the fifth row and the sixth row of scan lines g5 and g6 are driven by the left scan drive line G3, and so on.

Figure 10:
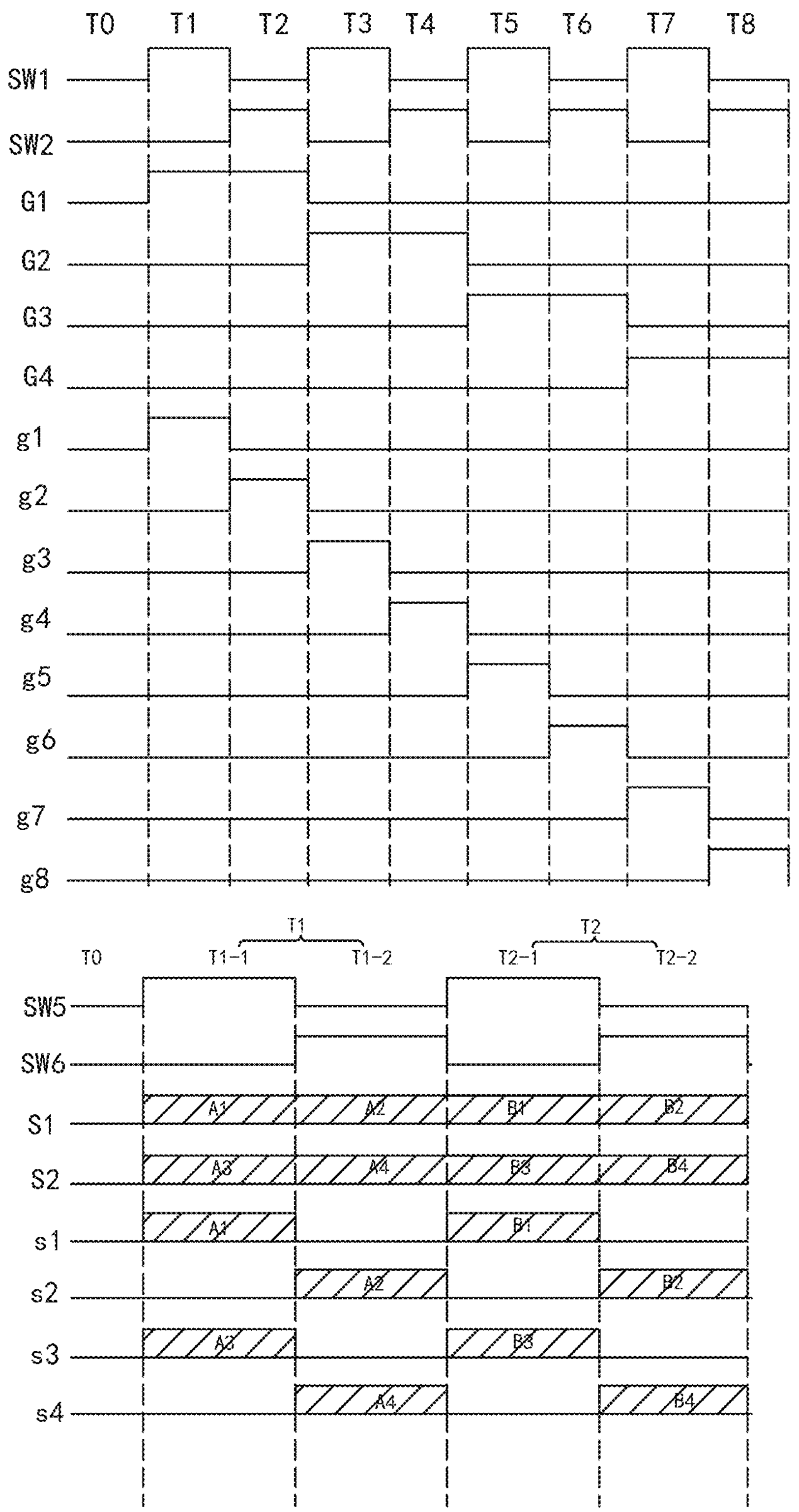
FIG. 10 is a timing diagram of a pixel drive circuit provided in Embodiment 3 of the present disclosure.

Referring to FIG. 10, a drive timing in this embodiment is as follows.

T0 phase: the first sub-control line SW1, the second sub-control line SW2, the third sub-control line SW3, and the fourth sub-control line SW4 each are low-level. The scan drive lines G1 to G540 and the source drive lines S1 to S960 each are low-level. The scan signals of scan lines g each are low-level (denoted as lowercase "g"), the data signals of data lines s each are low-level (denoted as lowercase "s"), and there is no charging action.

T1 phase: the first sub-control line SW1 is high-level, and the second sub-control line SW2 is low-level. The scan drive line G1 is high-level, and the scan drive lines G2 to G4 each are low-level. The first switch unit SW1-1 is turned on, the scan drive line G1 is connected to the scan line g1, the scan line g1 becomes high-level, and the one row of pixel unit 10 electrically connected to the scan line g1 starts to be charged, and the rest of the rows are silent.

T1-1 phase: the first control line SW5 is high-level, the second control line SW6 is low-level, TFTs such as the first sub-switch SW5-1, the third sub-switch SW5-2, and the fifth sub-switch SW5-3, etc., are turned on, and the pixels such as A1, A3, and A5 in the first row are charged.

T1-2 phase: the second control line SW6 is high-level, the first control line SW5 is low-level, TFTs such as the second sub-switch SW6-1, the fourth sub-switch SW6-2, and the sixth sub-switch SW6-3, etc., are turned on, and the pixels such as A2, A4, and A6 in the first row are charged.

T2 phase: the second sub-control line SW2 is high-level, and the first sub-control line SW1 is low-level. The scan drive line G1 remains high-level, and the rest are low-level. The second switch unit SW1-2 is turned on, the scan drive line G1 is connected to the scan line g2, the scan line g2 becomes high-level, the one row of pixel units 10 electrically connected to the scan line g2 starts to be charged, and the rest of the rows are silent.

T2-1 phase: the first control line SW5 is high-level, the second control line SW6 is low-level, TFTs such as the first sub-switch SW5-1, the third sub-switch SW5-2, and the fifth sub-switch SW5-3, etc., are turned on, and the pixels such as B1, B3, and B5 in the second row are charged.

T2-2 phase: the second control line SW6 is high-level, the first control line SW5 is low-level, TFTs such as the second sub-switch SW6-1, the fourth sub-switch SW6-2, and the sixth sub-switch SW6-3, etc., are turned on, and the pixels such as B2, B4, and B6 in the second row are charged.

T3 phase: the first sub-control line SW1 is high-level, and the second sub-control line SW2 is low-level. The scan drive line G2 is high-level, and the rest are low-level. The third switch unit SW2-1 is turned on, the scan drive line G2 is connected to the scan line g3, the scan line g3 becomes high-level, the one row of pixel units 10 electrically connected to the scan line g3 starts to be charged, and the rest of the rows are silent.

T4 phase: the second sub-control line SW2 is high-level, and the first sub-control line SW1 is low-level. The scan drive line G2 is high-level, and the rest are low-level. The fourth switch unit SW2-2 is turned on, the scan drive line G2 is connected to the scan line g4, the scan line g4 becomes high-level, the one row of pixel units 10 electrically connected to the scan line g4 starts to be charged, and the rest of the rows are silent.

T5 phase: reference can be made to the above signal logic, and charging can be started row by row.

The pixel drive circuit 100 and the display panel 1000 provided in the present disclosure have the following designs. Multiple columns of pixel units 10 are arranged in the row direction D2. Multiple data lines s are spaced apart from one another and extend in the column direction D1, where each data line s is electrically connected to one column of pixel units 10. The number of source drive lines S is less than the number of data lines s. The first connection end of each switch assembly K2 is electrically connected to at least one data line s, the second connection end of each switch assembly K2 is electrically connected to one source drive line S, and at least two data lines s are electrically connected to the same source drive line through different switch assemblies K2. In this way, multiple data lines can reuse one source drive line S, which reduces the number of source drive lines S, so that the pull-out angles of the source drive lines S of the display drive chip 200 are not too small, the wiring layout of the scan drive lines S is improved, the region occupied by the non-display region 310 is reduced, the bezel is narrowed, and the difficulty in wiring is reduced. In addition, multiple rows of pixel units 10 are arranged in the column direction D1. Multiple scan lines g are spaced apart from one another and extend in the row direction D2, where each scan line is electrically connected to one row of pixel units 10. The number of scan drive lines G is less than the number of scan lines g. The first connection end of each switch unit K1 is electrically connected to at least one scan line g, the second connection end of each switch unit K1 is electrically connected to one scan drive line G, and at least two scan lines g are electrically connected to the same scan drive line G through different switch units K1. In this way, the number of scan drive lines G is reduced, so that the scan drive lines G are arranged on two sides of only one display drive chip 200, and no space for wiring is needed between the bottom side of the display drive chip 200 and the edge of the display panel 1000, thereby saving wiring space in the non-display region 310 of the display panel 1000, reducing the width of the bottom bezel of the display panel 1000, narrowing the bezel, and increasing the proportion of the display region 300. Since both the number of scan drive lines G and the number of source drive lines S are reduced, e.g., reduced by half, the number of display drive chips 200 can reduced from two to one, which can effectively reduce the cost.

The above are some embodiments of the present disclosure, and it can be noted that those of ordinary skill in the art may further make improvements and modifications without departing from the principle of the present disclosure, and these improvements and modifications shall also belong to the scope of protection of the present disclosure.

What is claimed is:

1. A pixel drive circuit, comprising:

a plurality of columns of pixel units arranged in a row direction;

a plurality of data lines spaced apart from one another and extending in a column direction, wherein each of the plurality of data lines is electrically connected to one column of pixel units;

a plurality of source drive lines, wherein the number of source drive lines is less than the number of data lines;

a plurality of switch assemblies, wherein a first connection end of each of the plurality of switch assemblies is electrically connected to at least one of the plurality of data lines, a second connection end of each of the plurality of switch assemblies is electrically connected to one of the plurality of source drive lines, and at least two of the plurality of data lines are electrically connected to a same source drive line through different switch assemblies; and at least one first control line and at least one second control line, wherein each of the plurality of source drive lines is electrically connected to at least two of the plurality of data lines in adjacent columns;

the plurality of switch assemblies comprise a first sub-switch and a second sub-switch, a second connection end of the first sub-switch and a second connection end of the second sub-switch are electrically connected to a same source drive line, and a first connection end of the first sub-switch and a first connection end of the second sub-switch are electrically connected to two of the plurality of data lines in adjacent columns, respectively; and the at least one first control line is electrically connected to a control end of the first sub-switch, the at least one second control line is electrically connected to a control end of the second sub-switch, first control lines among the at least one first control line electrically connected to different source drive lines are electrically connected, and second control lines among the at least one second control line electrically connected to different source drive lines are electrically connected.

2. The pixel drive circuit of claim 1, wherein each of the plurality of source drive lines is configured to provide a plurality of data voltages during a row scanning period, and the plurality of data voltages are respectively supplied to different data lines through on-off of the plurality of switch assemblies.

3. The pixel drive circuit of claim 1, further comprising:

a plurality of scan lines spaced apart from one another and extending in the row direction, wherein each of the plurality of scan lines is electrically connected to one row of the pixel units;

a plurality of scan drive lines, wherein the number of scan drive lines is less than the number of scan lines; and a plurality of switch units, wherein a first connection end of each of the plurality of switch units is electrically connected to at least one of the plurality of scan lines, a second connection end of each of the plurality of switch units is electrically connected to one of the plurality of scan drive lines, and at least two of the plurality of scan lines are electrically connected to a same scan drive line through different switch units.

4. The pixel drive circuit of claim 3, wherein the plurality of scan drive lines comprise a plurality of first scan drive lines and a plurality of second scan drive lines, the plurality of first scan drive lines are disposed on one side of a plurality of rows of pixel units, and the plurality of second scan drive lines are disposed on the other side of the plurality of rows of pixel units.

5. The pixel drive circuit of claim 4, wherein one of the plurality of first scan drive lines is electrically connected to at least two of the plurality of scan lines in odd-numbered rows, and one of the plurality of second scan drive lines is electrically connected to at least two of the plurality of scan lines in even-numbered rows.

6. The pixel drive circuit of claim 4, wherein one of the plurality of first scan drive lines is electrically connected to at least two of the plurality of scan lines in adjacent rows, and one of the plurality of second scan drive lines is electrically connected to another at least two of the plurality of scan lines in adjacent rows.

7. The pixel drive circuit of claim 4, further comprising a plurality of switch control lines, wherein the plurality of switch control lines comprise a plurality of first switch control lines and a plurality of second switch control lines, the plurality of first switch control lines and the plurality of first scan drive lines are disposed on one side of the plurality of rows of pixel units, and the plurality of second switch control lines and the plurality of second scan drive lines are disposed on the other side of the plurality of rows of pixel units.

8. The pixel drive circuit of claim 7, wherein control ends of the plurality of switch units electrically connected to different first scan drive lines are electrically connected to a same first switch control line.

9. The pixel drive circuit of claim 7, wherein control ends of the plurality of switch units electrically connected to different second scan drive lines are electrically connected to a same second switch control line.

10. The pixel drive circuit of claim 8 wherein control ends of the plurality of switch units electrically connected to different second scan drive lines are electrically connected to a same second switch control line.

11. The pixel drive circuit of claim 3, wherein first connection ends of the plurality of switch units electrically connected to a same scan drive line and second connection ends of the plurality of switch units are conducted at different time periods in response to the plurality of scan drive lines being configured to provide a turn-on signal to each of the plurality of scan lines at different time sequences.

12. A display panel, comprising a display drive chip and the pixel drive circuit of claim 1, wherein the display panel has a display region, a first side region on one side of the display region, a second side region on the other side of the display region, and a bottom region at the bottom of the display region;

the display drive chip is disposed in the bottom region and has a first connection surface, a second connection surface, and a third connection surface connected in sequence, wherein the first connection surface faces the first side region, the second connection surface faces the display region, and the third connection surface faces the second side region;

the plurality of columns of pixel units, the plurality of scan lines, and the plurality of data lines are all disposed in the display region;

a part of the plurality of scan drive lines is disposed in the first side region and extends into the bottom region to be electrically connected to the first connection surface of the display drive chip, the other part of the plurality of scan drive lines is disposed in the second side region and extends into the bottom region to be electrically connected to the third connection surface of the display drive chip; and the plurality of source drive lines are disposed in the bottom region and are electrically connected to the second connection surface of the display drive chip.

13. The display panel of claim 12, wherein each of the plurality of source drive lines is configured to provide a plurality of data voltages during a row scanning period, and the plurality of data voltages are respectively supplied to different data lines through on-off of the plurality of switch assemblies.

14. The display panel of claim 12, further comprising:

a plurality of scan lines spaced apart from one another and extending in the row direction, wherein each of the plurality of scan lines is electrically connected to one row of the pixel units;

a plurality of scan drive lines, wherein the number of scan drive lines is less than the number of scan lines; and a plurality of switch units, wherein a first connection end of each of the plurality of switch units is electrically connected to at least one of the plurality of scan lines, a second connection end of each of the plurality of switch units is electrically connected to one of the plurality of scan drive lines, and at least two of the plurality of scan lines are electrically connected to a same scan drive line through different switch units.

* * * * *